United States Patent [19]

McKillop

[11] Patent Number: 5,552,692
[45] Date of Patent: Sep. 3, 1996

[54] CHARGING RECHARGEABLE BATTERIES OF A MOBILE COMMUNICATION DEVICE USING A CHARGE PUMP WITH A LOW NOISE OSCILLATOR TO REDUCE INTERFERENCE

[75] Inventor: William A. M. McKillop, Berkshire, England

[73] Assignee: Nokia Mobile Phones Ltd., Salo, Finland

[21] Appl. No.: 274,679

[22] Filed: Jul. 13, 1994

[30] Foreign Application Priority Data

Dec. 22, 1993 [GB] United Kingdom ............... 9326228

[51] Int. Cl.⁶ ..................................... H01M 10/44
[52] U.S. Cl. ........................... 320/9; 455/99; 455/127
[58] Field of Search ................ 320/5, 12, 9; 455/89, 455/90, 99, 127, 345

[56] References Cited

U.S. PATENT DOCUMENTS

| | | | |
|---|---|---|---|
| 4,510,431 | 4/1985 | Winkler | 320/1 |
| 4,638,236 | 1/1987 | Carr et al. | 320/21 |
| 4,684,870 | 8/1987 | George et al. | 320/20 |
| 4,733,159 | 3/1988 | Edwards et al. | 323/282 |
| 5,272,475 | 12/1993 | Eaton et al. | 340/825.44 |
| 5,333,176 | 7/1994 | Burke et al. | 379/58 |
| 5,438,696 | 8/1995 | Napoles | 455/343 |

FOREIGN PATENT DOCUMENTS

| | | | |
|---|---|---|---|
| 310318A | 5/1989 | European Pat. Off. | 455/99 |
| 0393653 | 10/1990 | European Pat. Off. | |
| 4107597 | 9/1992 | Germany. | |
| 1450238 | 9/1976 | United Kingdom. | |
| 1571892 | 7/1980 | United Kingdom. | |
| 2193392 | 2/1988 | United Kingdom. | |

*Primary Examiner*—Peter S. Wong
*Assistant Examiner*—Gregory Toatley
*Attorney, Agent, or Firm*—Perman & Green

[57] ABSTRACT

A voltage modifying device for charging rechargeable batteries, such as nicad batteries, used for powering mobile radio telephones from a DC source, such as that provided in a vehicle. The device is connectable to a DC power source, a rechargeable battery and the power input of a telephone transceiver. Power from the DC power source is directed to the transceiver and the voltage modifying circuit modifies the supply voltage so as to provide a charging current to the rechargeable battery. The modifying circuit includes a charge pump for increasing the charging voltage in addition to circuitry arranged so as to charge and discharge said charge pump at substantially constant current so as to minimize telephone transceiver interference.

15 Claims, 4 Drawing Sheets

CHARGING RECHARGEABLE BATTERIES OF A MOBILE COMMUNICATION DEVICE USING A CHARGE PUMP WITH A LOW NOISE OSCILLATOR TO REDUCE INTERFERENCE

FIELD OF THE INVENTION

The present application relates to a voltage modifying device for charging rechargeable batteries and a method of charging rechargeable batteries.

BACKGROUND OF THE INVENTION

Radio cellular telephones are known in which a transmitter/receiver (transceiver) is provided with its own local nickel cadmium (nicad) battery. The nicad battery delivers 12V to the transceiver, such that said transceiver may be powered directly from an automobile battery. Thus, such transceivers may be used in an automobile, deriving power via a cigar lighter adaptor for example or, alternatively, they may be used externally from the automobile, deriving power from their own local power source.

With telephones arranged to operate from power supplies of substantially less than 12V, it is possible to power the telephone from a cigar lighter adaptor via a suitable voltage dropping circuit and to simultaneously re-charge the telephone's local battery power pack. Such a system is disclosed in European Patent Publication 0 393 653.

However, transceivers designed to provide optimum performance when used in vehicles are designed to operate directly from a vehicle's battery supply, usually providing 12V. Such systems can be provided with a local 12V battery supply, so that they may be removed from the vehicle and used while disconnected from the vehicle's power supply. Such batteries may also be charged from mains supplies, using suitable transforming and rectifying equipment, however, a problem arises if an attempt is made to charge a telephone's local battery using power derived from a vehicle's battery, via, for example, a cigar lighter adaptor, given that both batteries nominally supply 12V. Thus, a direct connection between the vehicle's battery and the transceiver's battery will only result in the transceiver's battery being charged when it is in a very low-charge condition. As soon as the charge builds up within the transceiver's battery, the potentials of the two batteries will balance and charging current will no longer flow.

Inductive DC/DC convertors are known, in which a DC voltage supply is stepped up using an inductive coil so as to provide a charging current at a higher voltage than the electromotive force on the battery being charged. However, a problem arises if a user wishes to charge a transceiver battery from a vehicle supply while at the same time operating the cellular radio telephone. The inductive nature of the DC/DC convertor, operating at substantially high frequency, will result in radiation which will readily interfere with the operation of the cellular telephone. Such radiation will also tend to interfere with other electronic equipment provided within the vehicle, such as electronic ignition and vehicle entertainment systems, but interference with the cellular radio telephone is particularly acute, given its operating frequency. Thus, when inductive DC/DC convertors are provided it is essential to maintain a significant level of filtering and screening, so as to ensure that the operation of the convertor does not interfere with the operation of the radio telephone. Such filtering and screening significantly adds to the cost of the device, therefore the converting device becomes relatively expensive compared to the cost of the overall system. It is an object of the present invention to provide an improved voltage modifying device.

SUMMARY OF THE INVENTION

According to an aspect of the present invention, there is provided a voltage modifying device for charging rechargeable batteries used for powering mobile radio telephones from a DC source, comprising means connectable to a DC power source; means connectable to a rechargeable battery; means connectable to a power input of a telephone receiver; means for connecting said DC power source to said transceiver so as to direct power to said transceiver; and a voltage modifying circuit for applying a charging voltage to said battery, said modifying circuit including a charge pump circuit for increasing said charging voltage and means for charging and discharging said charge pump circuit at substantially constant current so as to minimize telephone transceiver interference.

Thus, the charging and discharging of the charge pump capacitor and substantially constant current ensures that radiation from the circuit is minimized, thereby significantly reducing measures required for eliminating interference. Thus, nicad batteries may be charged from the vehicle supply, while at the same time supplying power to the mobile telephone, such that said telephone may be used while its nicad batteries are being re-charged.

Preferably, said charging and discharging at constant current is controlled in response to an oscillator and said oscillator may operate at substantially 70 cycles per second.

DETAILED DESCRIPTION OF THE PREFERRED EMBODIMENT

Figure 1:
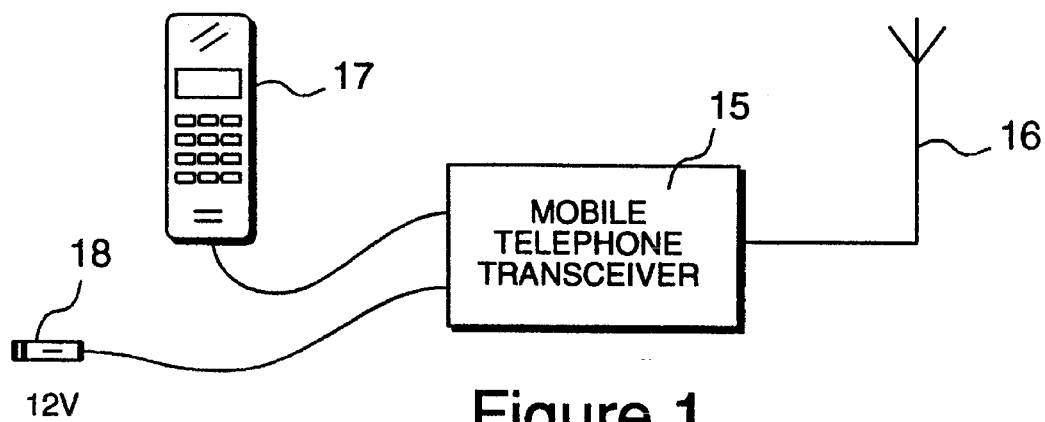
FIG. 1 shows a mobile telephone system, receiving power from a vehicle supply.

A mobile cellular radio telephone system is shown in FIG. 1, arranged to operate in a vehicle and to receive power from the vehicle's 12V supply, via a cigar/cigarette lighter adaptor. The system includes a transceiver 15 having an aerial 16 so as to facilitate radio communication with cellular base stations. An operator uses the telephone system by means of a conventional handset 17 and power is supplied to the transceiver from the vehicle's 12V supply via a cigar lighter adaptor or similar device 18.

Figure 2:
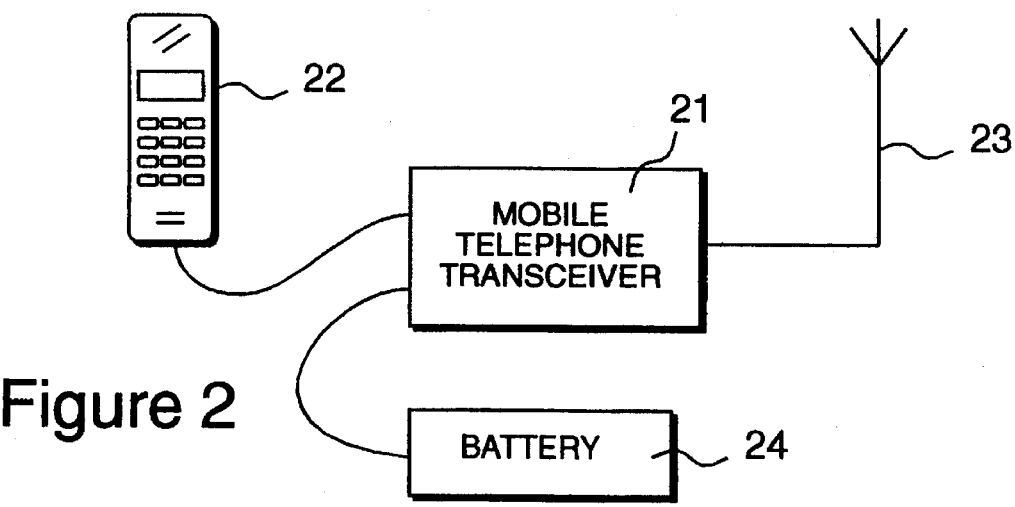
FIG. 2 shows a mobile telephone system, receiving power from a local rechargeable battery.

FIG. 2 shows a mobile telephone system similar to that shown in FIG. 1, in which a transceiver 21 provides communication via a handset 22 and an aerial 23. However, rather than being powered from a vehicle supply, the transceiver 21 receives power from its own local supply in the form of a nicad rechargeable battery 24. Thus, the system shown in FIG. 2 may be used completely independently of any vehicle and may be carried by an operator. Possibly, an operator may also use the system in a vehicle from the vehicle's supply by disconnecting the battery 24 and connecting a supply cable similar to that shown in FIG. 1. In such circumstances, the local battery 24 provides power at 12V, equivalent to the vehicle supply, ensuring that the transceiver 21 is compatible with both power sources. The transceiver 21 will operate in the same way irrespective of its power supply and will tend to operate at power levels compatible with those employed in vehicle systems. Thus, the system shown in FIG. 2 is of the type sometimes referred to as a "transportable".

The transceiver 21 and battery 24 may be held in a suitable carrying case and operation via the handset 22 is effected, thereby maintaining an operational distance between said handset and the aerial 23. Clearly, a problem with the system shown in FIG. 2 is that the battery 24 will require re-charging and this would normally be done using a transformer connected to a mains supply. However, if an operator spends a significant amount of time away from a mains supply source, the battery 24 will completely discharge and the system will become inoperable.

Figure 3:
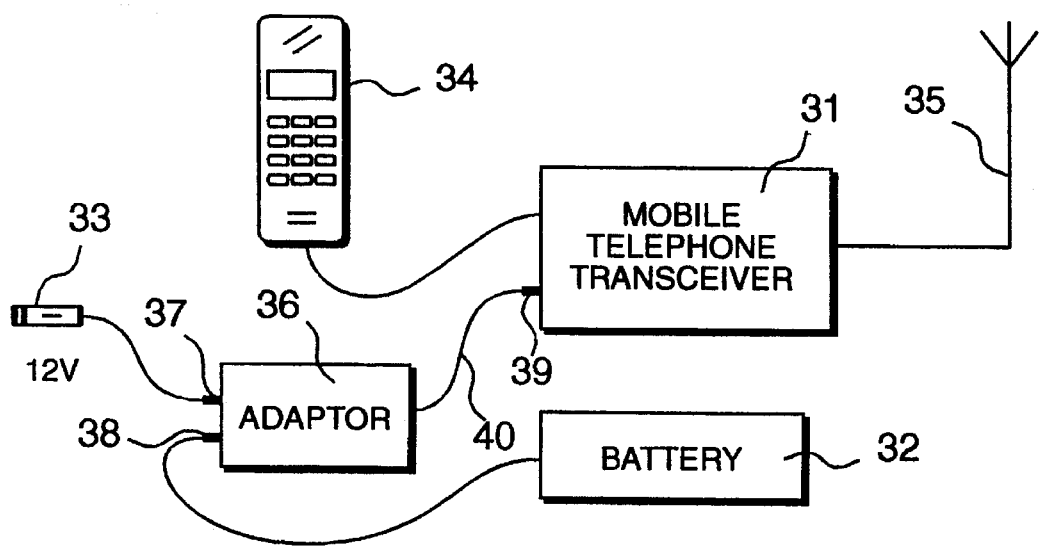
FIG. 3 shows a mobile telephone system, arranged to receive power from a local battery or from a vehicle supply including an adaptor for re-charging said local battery while power is being supplied to a transceiver from said vehicle supply.

A more sophisticated system, using a transceiver 31 and battery 32, similar to devices 21 and 24 of FIG. 2, is shown in FIG. 3. In this situation the transceiver 31 may receive power from its local battery 32 or directly from a vehicle supply via a cigar lighter adaptor 33. The transceiver 31 facilitates communication via a handset 34 and an aerial 35 while receiving power via an adaptor 36. The adaptor 36 is arranged to supply power to the transceiver 31 directly from the vehicle supply, via adaptor 33, when such a supply is available. Thus normally, a supply of this type will be available whenever the cigar lighter adaptor 33 is located within the cigar lighter socket or within a similar device connected to the vehicle's power supply. When the cigar/cigarette lighter adaptor is removed or, alternatively, when the vehicle's power supply is switched off, the adaptor 36 senses that vehicle power supply is no longer available and switches over to the transceiver's local battery 32. Voltage sensing circuits are provided within the adaptor 36 in addition to a storage capacitor, thereby ensuring that the adaptor 33 may be removed while the mobile telephone is in operation, without adversely affecting the telephone call.

As previously stated, while the adaptor 33 is receiving power from the vehicle supply, said power is supplied directly to the transceiver 31 thereby allowing said device to function. In addition, while power from the vehicle supply is available, the adaptor 36 is also arranged to supply a charging current to the battery 32. Thus, an operator may disconnect device 33, use the telephone remotely from a vehicle for a number of hours, return to the vehicle, operate the telephone system via the vehicle supply, either in communicating mode or standby mode, while simultaneously charging the battery 32. Thus, the battery 32 may be completely re-charged while connected to the vehicle supply such that said system may be repeatedly removed from the vehicle while maintaining the telephone connection.

The adaptor 36 includes a voltage modifying device for charging rechargeable battery 32, so that a nicad battery providing 12V may be charged from a 12V supply. The adaptor 36 therefore includes a socket 37 which receives a cable from the cigar lighter adaptor 33, thereby supplying DC power from the vehicle's DC power source. A similar socket 38 receives a cable connectable to the rechargeable battery 32. The adaptor 36 is configured such that it can be added to existing systems, such as the systems illustrated in FIGS. 1 and 2, therefore it is possible for the lead extending from battery 32 to be plugged directly into the transceiver, via socket 39 or for the lead extending from the cigar lighter adaptor 33 to be plugged directly into the transceiver via socket 39. Consequently, the adaptor 36 is provided with a lead 40 having a plug thereon which is connectable to socket 39.

Figure 4:
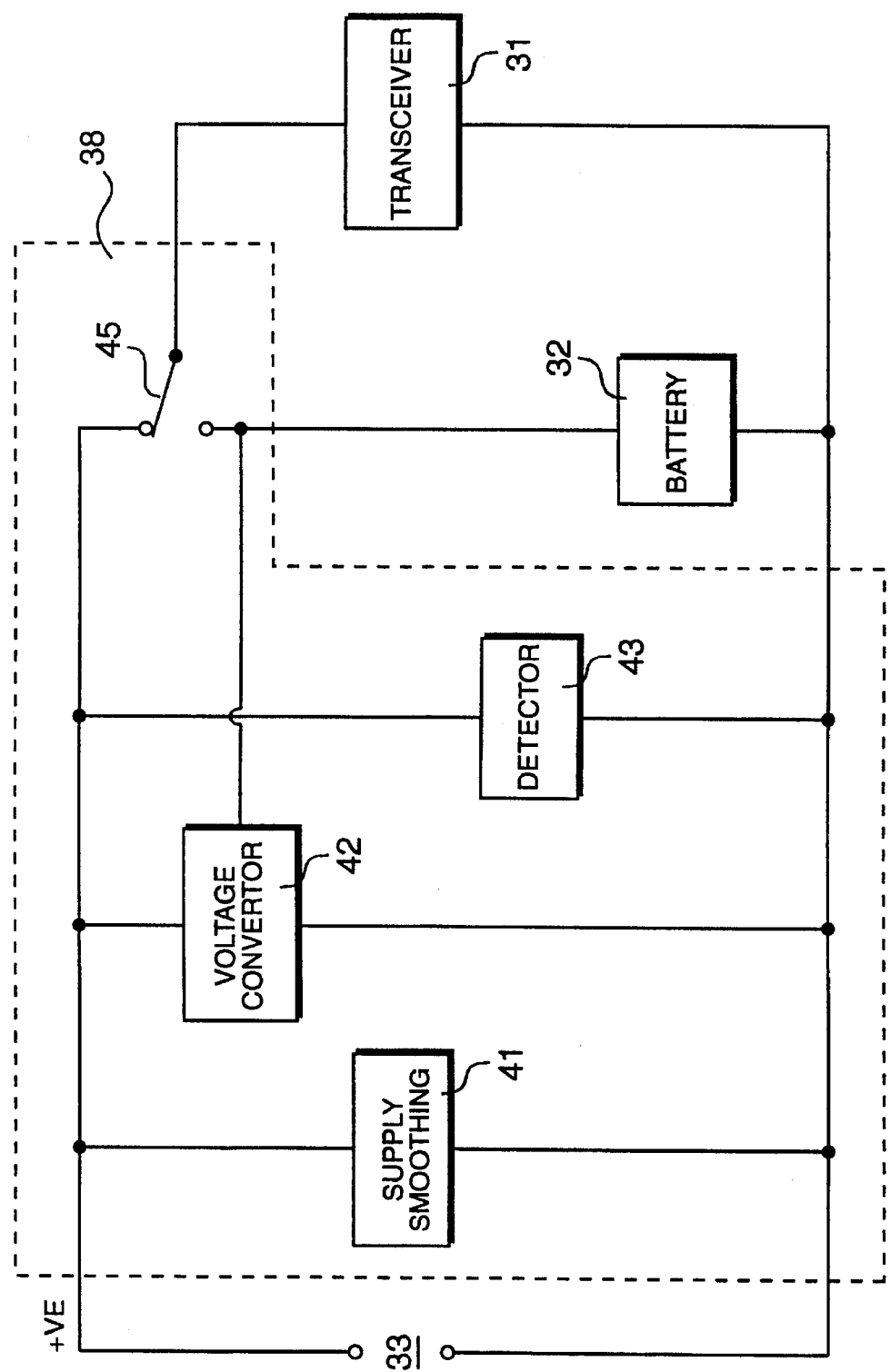
FIG. 4 shows a schematic representation of the transceiver, local battery, voltage source and adaptor illustrated in FIG. 3.

The transceiver 31, nicad battery 32, power source terminals 33 and adaptor 38 are schematically shown in FIG. 4. The adaptor 36 includes a smoothing device 41, a voltage convertor 42, a voltage detector 43 and a relay device 45.

Detector 43 detects that terminals 33 are connected to a vehicle voltage supply. When terminals 33 are connected to a supply, this voltage is detected by detector 43 which in turn operates relay 45 to the position shown in FIG. 4. Thus, in the position shown in FIG. 4, the 12V supply voltage is applied across the transceiver 31, via relay 45. Similarly, an output from voltage convertor 42 is applied across to the nicad battery 32. Thus, in the position shown in FIG. 4, the transceiver 31 receives power directly from the vehicle supply via terminals 33 and the nicad battery 32 receives charging current from the voltage convertor 42.

If the vehicle supply is disconnected, usually by the cigar lighter adaptor 33 being removed, detector 43 ceases to detect the presence of a voltage, resulting in relay 45 switching to its alternative position in which the nicad battery 32 supplies power to the transceiver 31.

Smoothing device 41 removes switching spikes from the voltage supply lines and thereby protects the components within the voltage convertor 42. The components housed within adaptor 38 shown in FIG. 3 are identified by hashed line 38 shown in FIG. 4.

Figure 5:
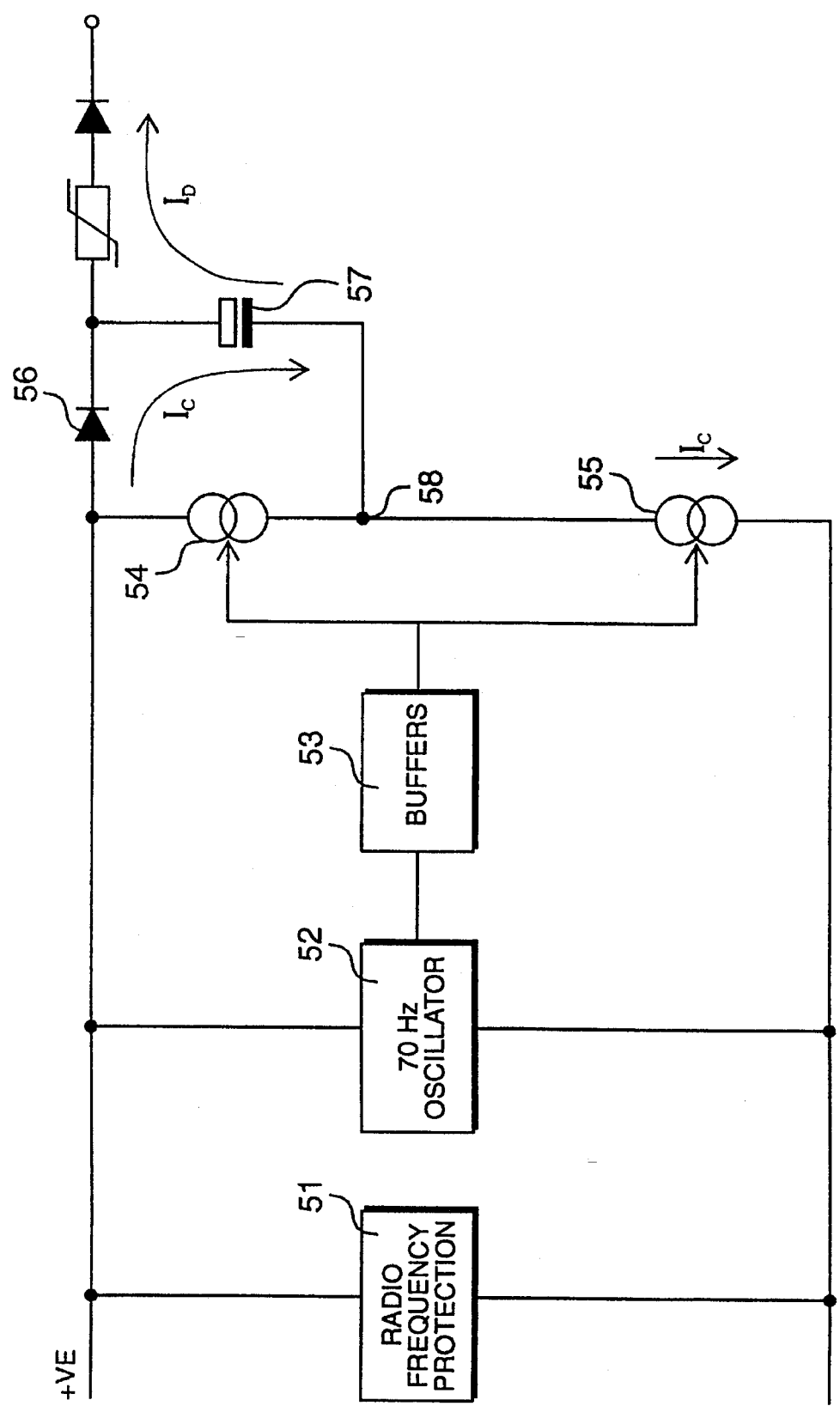
FIG. 5 shows a block diagram of the voltage convertor shown in FIG. 4.

The voltage convertor 42 shown in FIG. 4 is detailed in FIG. 5. The voltage convertor 42 is connected between the positive and negative supply rails and supplies an up-rated voltage to the relay 45, which is in turn directed towards the battery 32. A device 51 is provided across the supply rails in order to filter out induced radio frequency interference. A 70 Hz square wave oscillator 42 supplies a 12V peak to peak signal to a current buffering circuit 53 which in turn drives constant current source devices 54 and 55.

The 70 Hz square wave oscillator 42 employs a high impedance CMOS Schmitt inverter gate, so as to minimize radiation. However, output buffering is required due to the relatively low output current capability.

An advantage of operating at 70 Hz is that harmonics of this low frequency are at a much lower level in the cellular frequency bands of interest than in a conventional convertor operating at say 200 kHz.

Constant current source 54 is a p-type device while constant current source 55 is an n-type device. Consequently, device 55 is conductive during each capacitor charging cycle while device 54 is conductive, with device 55 being non-conductive, during each capacitor discharging cycle.

During a charging cycle, device 54 is non-conductive, therefore charging current flows through a diode 56 and charges up a capacitor 57, with a return path being provided via device 55. Thus, device 55 ensures that capacitor 57 is charged at substantially constant current.

During the second half of each cycle device 55 is effectively switched off while device 54 becomes conducting.

The voltage at junction 58 ramps up to a level approaching that of the 12V supply rail. Thus the negative plate of capacitor 57 may be considered as having a voltage equivalent to that of the 12V supply rail with a positive voltage difference being present on the positive plate of said capacitor. The positive plate of capacitor 57 is isolated from device 54 by means of diode 56, therefore the voltage appearing on the cathode of diode 56 is equivalent to the voltage supply rail plus the voltage present on the capacitor. Thus, in this way the output voltage has been increased. With this increased voltage, current can be supplied in order to charge the 12V nicad battery which, taking place via device 54, will also occur at substantially constant current.

The charging and discharging of capacitor 57 at substantially constant current ensures that current flowing through the input and ground return rails does not fluctuate, so that said components do not radiate high frequency signals which could be inductively received elsewhere. Thus, the circuit has inherent minimal radiation characteristics, enabling it to be constructed with substantially fewer filtering and shielding elements.

Figure 6:
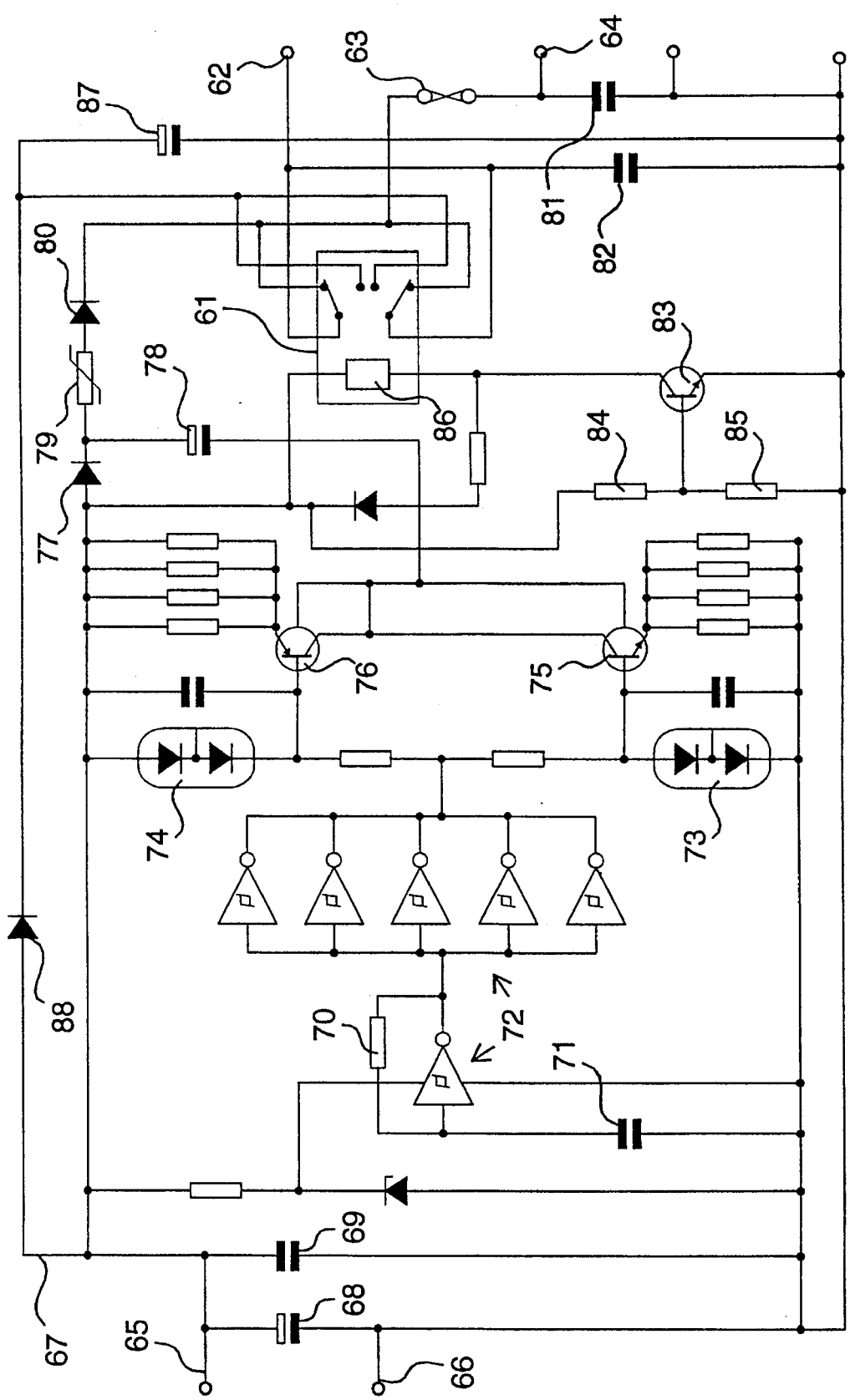
FIG. 6 shows a detailed circuit diagram of the voltage convertor shown in FIG. 4.

A detailed circuit diagram of the adaptor device 36 is shown in FIG. 6. Relay 45 of FIG. 4 is realized as a dual pole type 47 relay 61. The relay is shown in its non-energized condition, such that a terminal 62, connectable to the transceiver 31, is connected via said relay 61, a fuse 63 and a terminal 64 to the nicad battery 32; switching poles being duplicated for enhanced reliability. Thus, in this condition, the transceiver receives power from the nicad battery, as occurs when the cigar lighter adaptor 33 has been removed and the telephone is being used remotely from the vehicle.

On inserting the cigar/cigarette lighter adaptor 33 into the vehicle's car supply, the vehicle's voltage is connected across terminals 65 and 66, thereby energizing positive supply rail 67. Supply smoothing device 41 is implemented as a 10 micro farad electrolytic capacitor 68, arranged to remove switching spikes from the voltage supply.

Radio frequency protection device 51 is implemented as a 47 nano farad capacitor 69 and the 70 Hz oscillator 52 is implemented as one inverter of a CMOS 40106 integrated circuit 72. The switching frequency is determined by a time constant defined by resistor 70 of 390 k ohm and capacitor 71 of 47 nano farad. The current buffering circuit 53 is implemented by the five remaining 40106 inverters connected in parallel.

Diodes 73 and 74 limit the voltage applied to the bases of transistors 75 and 76 respectively. A substantially constant voltage is thereby provided to the bases of these devices, resulting in a substantially constant current flowing through their respective emitters. The emitters of transistors 75 and 76 are connected to respective supply rails via a parallel chain of resistors providing a total resistance of 2.5 ohm at 400 milli watt. This resistance is provided as a plurality of resistors, each of 10 ohm in order to facilitate circuit implementation.

Diode 56, responsible for the charge pumping of capacitor 57, is implemented as a BYD 17D type diode 77 and capacitor 57 is implemented as a 470 micro farad high ripple current capacitor rated at 25V. During discharge cycles, capacitor 78 supplies battery charging current to terminal 64 via a positive temperature coefficient device 79 and a diode 80, type BYD 170. Positive temperature coefficient device 79 protects the nicad battery if the voltage is supplied to the supply rail 67 becomes unusually high, possibly due to an alternator fault or a nicad battery fault. Diode 80 prevents the nicad battery discharging back through the circuit.

A capacitor 81, connected across the nicad battery terminal 64 is a 47 nano farad device arranged to prevent radio frequency signals picked up by the nicad battery being supplied back into the circuit. A similar capacitor 82 decouples radio frequency pickup from the transceiver output 62.

The detector 43 is implemented by means of a BCW 32 NPN transistor 83, biased by a first resistor 84 of 2K7 ohm and a second resistor 85 of 220 ohm. When voltage is supplied to supply rail 67, the current flows through resistors 84 and 85, thereby applying a voltage to the base of transistor 83 rendering said transistor conductive. As a result of this, current flows through an energizing coil 86 of the relay 61, thereby operating said relay and ensuring that power to the transceiver is supplied directly from the vehicle supply, via terminal 62, while charging current is supplied to the nicad battery via terminal 64.

A voltage holdup capacitor 87 maintains current to the transceiver while relay 61 switches. Thus, when the cigar/cigarette lighter adaptor 33 is removed from a socket, a finite period elapses before the contacts within relay 61 have switched over, so that the transceiver 31 receives power from its own nicad battery 32. While this occurs, power is received from capacitor 87. Diode 88 ensures that transistor 83 switches as soon as the supply voltage disappears, effectively ensuring that the supply rail to transistor 83 is not held up by capacitor 87.

What we claim is:

1. A voltage modifying device for charging rechargeable batteries used for powering mobile radio telephones from a DC source, comprising means connectable to a DC power source;

means connectable to a rechargeable battery;

means connectable to a power input of a telephone transceiver;

means for connecting said DC power source to said transceiver so as to direct power to said transceiver; and a voltage modifying circuit for applying a charging voltage to said battery, said modifying circuit including a charge pump circuit for increasing said charging voltage, and means for charging and discharging said charge pump circuit at substantially constant current so as to minimize telephone transceiver interference.

2. A device according to claim 1, wherein said means connectable to a rechargeable battery are connectable to a nickel-cadmium Battery.

3. A device according to claim 1, wherein said DC power is derived from a power supply in a motor vehicle.

4. A device according to claim 3, wherein said means connectable to a DC power source are connectable to a cigar/cigarette lighter adaptor.

5. A device according to claim 1, wherein said rechargeable battery supplies substantially 12V.

6. A device according to claim 1, wherein said DC power source is connected directly to the power input of the telephone transceiver.

7. A device according to claim 1, including a relay arranged to connect said transceiver to said rechargeable battery when said DC power source is removed.

8. A device according to claim 7, including a storage capacitor arranged to maintain power to said transceiver while switching between said DC source and said rechargeable battery is executed.

9. A device according to claim 1, wherein said charging and discharging a constant current is controlled in response to an oscillator.

10. A device according to claim 9, wherein said oscillator operates at substantially 70 cycles per second.

11. A device according to claim 1, wherein said means connectable to a power input of a telephone transceiver is connectable to a power input of a cellular telephone receiver.

12. A method of charging a rechargeable battery for a mobile radio telephone, comprising steps of connecting an adaptor to a DC power source, a rechargeable battery and a telephone transceiver, wherein said adaptor connects said power source to said transceiver, charges a charge pump circuit at substantially constant current from said power source; and discharges said charge circuit pump at substantially constant current to supply charging current to said rechargeable battery.

13. A method according to claim 12, wherein said rechargeable battery is connected to said transceiver when said adaptor is disconnected from said power source.

14. A method according to claim 12, wherein said charging and discharging constant current is controlled in response to an oscillator, oscillating at between 50 and 150 cycles per second.

15. In an automobile having a cigar lighter adaptor or similar device for supplying electrical power, and a mobile telephone having a rechargeable battery, a voltage modifying device for charging said rechargeable battery, comprising means connected to said supply of electrical power;

means connected to said rechargeable battery;

means connected to a power input of said cellular telephone;

means connecting said supply of electrical power to said cellular telephone so as to power said cellular telephone; and a voltage modifying circuit for applying a charging voltage to said rechargeable battery, said modifying circuit including a charge pump circuit for increasing said charging voltage, and means for charging and discharging said charge pump circuit at substantially constant current so as to minimize mobile telephone interference.

\* \* \* \* \*